United States Patent
Sherrets et al.

(10) Patent No.: US 9,294,583 B1
(45) Date of Patent: Mar. 22, 2016

(54) UPDATING EVENT POSTS (71) Applicant: Google Inc., Mountain View, CA (US)

(72) Inventors: Doug Sherrets, San Francisco, CA (US); Benjamin David Eidelson, Palo Alto, CA (US); Anish Acharya, San Francisco, CA (US); Andrew Dahley, San Francisco, CA (US); Raymond Win, San Francisco, CA (US)

(73) Assignee: Google Inc., Mountain View, CA (US)

( * ) Notice: Subject to any disclaimer, the term of this patent is extended or adjusted under 35 U.S.C. 154(b) by 371 days.

(21) Appl. No.: 13/843,723

(22) Filed: Mar. 15, 2013

(51) Int. Cl.
H04L 29/08 (2006.01)
G06F 17/30 (2006.01)
G06Q 50/00 (2012.01)
G06Q 30/02 (2012.01)

(52) U.S. Cl.
CPC .......... H04L 67/306 (2013.01); G06F 17/3053 (2013.01); G06F 17/30699 (2013.01); G06Q 30/0269 (2013.01); G06Q 50/01 (2013.01)

(58) Field of Classification Search
None
See application file for complete search history.

(56) References Cited

U.S. PATENT DOCUMENTS

2012/0005224 A1* 1/2012 Ahrens et al. .................. 707/769
2012/0278387 A1* 11/2012 Garcia ................... G06Q 50/01 709/204
2012/0308077 A1* 12/2012 Tseng .................... G06Q 50/01 382/103
2012/0310968 A1* 12/2012 Tseng ............... G06F 17/30247 707/769
2013/0066986 A1* 3/2013 DiCosola ....................... 709/206
2013/0212176 A1* 8/2013 Koulomzin ............ G06Q 50/01 709/204
2013/0217416 A1* 8/2013 Matthews et al. .......... 455/456.2
2013/0246521 A1* 9/2013 Schacht et al. ................ 709/204
2013/0332307 A1* 12/2013 Linden ............... G06Q 30/0631 705/26.7
2013/0332523 A1* 12/2013 Luu ..................... G06Q 30/0251 709/204
2014/0012927 A1* 1/2014 Gertzfield et al. ............ 709/206
2014/0089400 A1* 3/2014 Yan ......................... G06Q 50/01 709/204
2014/0095599 A1* 4/2014 Engle ..................... G06Q 50/01 709/204
2014/0108526 A1* 4/2014 Garcia-Barrio ........ G06Q 50/01 709/204
2014/0143324 A1* 5/2014 Lessin ............... G06F 17/30091 709/204
2014/0162694 A1* 6/2014 Maier ..................... H04W 4/04 455/456.3
2014/0250175 A1* 9/2014 Baldwin ................ G06Q 50/01 709/204
2014/0279418 A1* 9/2014 Rubinstein et al. ............. 705/39
2014/0280134 A1* 9/2014 Horen ..................... G06Q 10/10 707/736

* cited by examiner

Primary Examiner — Backhean Tiv
(74) Attorney, Agent, or Firm — IP Spring (57) ABSTRACT Implementations generally relate to updating events in a social network system. In some implementations a method includes generating one or more event objects having an event information section associated with a first user. The method also includes sending a post from the first user to one or more target users in a social network system, updating the one or more event objects based on the event information section, and causing the one or more updated event objects to be displayed along with the post to the one or more target users in the social network system.

20 Claims, 6 Drawing Sheets

UPDATING EVENT POSTS

BACKGROUND

Social network systems often enable users to post messages with other users. When a user posts messages, a social network system typically enables the user to post information about an event that the user is attending. For example, the user may post an image of a play from a sports event. The social network system typically displays messages from different senders in chronological order. The system typically displays the new post at the top of the stream of messages. Once posted, the recipients of the post may view and comment on the posts.

SUMMARY

Implementations generally relate to updating event information in posts to users in a social network system. In some implementations, a method includes receiving location data related to a location of a first user, and receiving temporal data corresponding to a time when the first user is at the location. The method also includes generating one or more event objects having an event information section associated with the first user; and the event information section is based on the location data and the temporal data. The method also includes sending a post from the first user to one or more target users in a social network system, updating the one or more event objects based on the event information section, and causing the one or more event objects to be displayed along with the post to the one or more target users in the social network system.

In some implementations a method includes generating one or more event objects having an event information section associated with a first user. The method also includes sending a post from the first user to one or more target users in a social network system, updating the one or more event objects based on the event information section, and causing the one or more updated event objects to be displayed along with the post to the one or more target users in the social network system.

With further regard to the method, in some implementations, the method also includes receiving location data related to a location of a first user with the first user's consent, where the location data is provided by activity data associated with one or more actions of the user. With further regard to the method, in some implementations the method also includes receiving temporal data corresponding to activity data associated with one or more actions of the first user. With further regard to the method, in some implementations, the method also includes receiving location data from a global positioning system (GPS) sensor included in a device of the first user. In some implementations, the event information section is determined from check-in information associated with a device of the first user. In some implementations, the event information section includes context information relevant to the event information. In some implementations, the updating of the one or more event objects based on the event information section is provided from information about an event based on the time of the displaying of the one or more event objects. In some implementations, the event information section includes context information; and a ranking of the post is determined in part based on the context information. In some implementations, the updating of the one or more event objects based on the event information section is provided at the time the one or more target users in the social network system view the post. In some implementations, the updated one or more event objects are displayed along with comments to the post provided by the one or more target users in the social network system.

In some implementations, a system includes one or more processors, and logic encoded in one or more tangible media for execution by the one or more processors. When executed, the logic is operable to perform operations including generating one or more event objects having an event information section associated with a first user. The logic when executed is further operable to perform operations including sending a post from the first user to one or more target users in a social network system, updating the one or more event objects based on the event information section, and causing the one or more updated event objects to be displayed along with the post to the one or more target users in the social network system.

With further regard to the system, in some implementations, the logic when executed is further operable to perform operations including receiving location data related to a location of a first user; and the location data is provided by activity data associated with one or more actions of the user. With further regard to the system, in some implementations, the logic when executed is further operable to perform operations including receiving temporal data corresponding to activity data associated with one or more actions of the first user. With further regard to the system, in some implementations, the logic when executed is further operable to perform operations including receiving location data from a global positioning system (GPS) sensor included in a device of the first user. With further regard to the system, in some implementations, the logic when executed is further operable to perform operations including receiving location data and temporal data of the first user, and where the location data and temporal data are determined from check-in information associated with a device of the first user. In some implementations, the event information section includes context information relevant to the event. In some implementations, the updating of the one or more event objects based on the event information section is provided from information about an event based on the time of the displaying of the one or more event objects. In some implementations, the updating of the one or more event objects based on the event information section is provided from specific and relevant information about an event, and is based on the time of the displaying of the one or more event objects. In some implementations, the updating of the one or more event objects based on the event information section is provided at the time the one or more target users in the social network system view the post.

Implementations described herein provide various advantages. For example, implementations encourage users to post messages, because the system facilitates the user in updating posts with important and interesting actions from an event. As such, implementations described herein also increase overall engagement among users in a social networking environment.

DETAILED DESCRIPTION

Implementations described herein provide a system for facilitating users of a social network system in updating event information in posts. In some implementations, a system receives the location of a user and a time when the first user is at the location. For example, the user may have checked in to an event before the start of the event. In one implementation, the system generates event objects, and has an event information section associated with the user. In some implementations, the system sends a post from the user to target users in a social network system. For example, the user may send a post indicating that he or she is at the event; and the system may generate an event object indicating that the time the post was received is prior to the start time of the event.

In one implementation, the system updates the event objects based on the event information section, and displays the event objects along with the post to the target users in the social network system. For example, the system, without further user input, may update the event information to indicate the time period of an event.

In some implementations, the event information section includes context information relevant to the event information. Examples of context information may be actions that occur during the event that are notable or interesting.

In one implementation, updating of the one or more event objects based on the event information section is provided at the time the target users in the social network system view or comment on the post. In some implementations, when a user views or comments on a post, the system generates and displays context information relevant to the event information.

Figure 1:
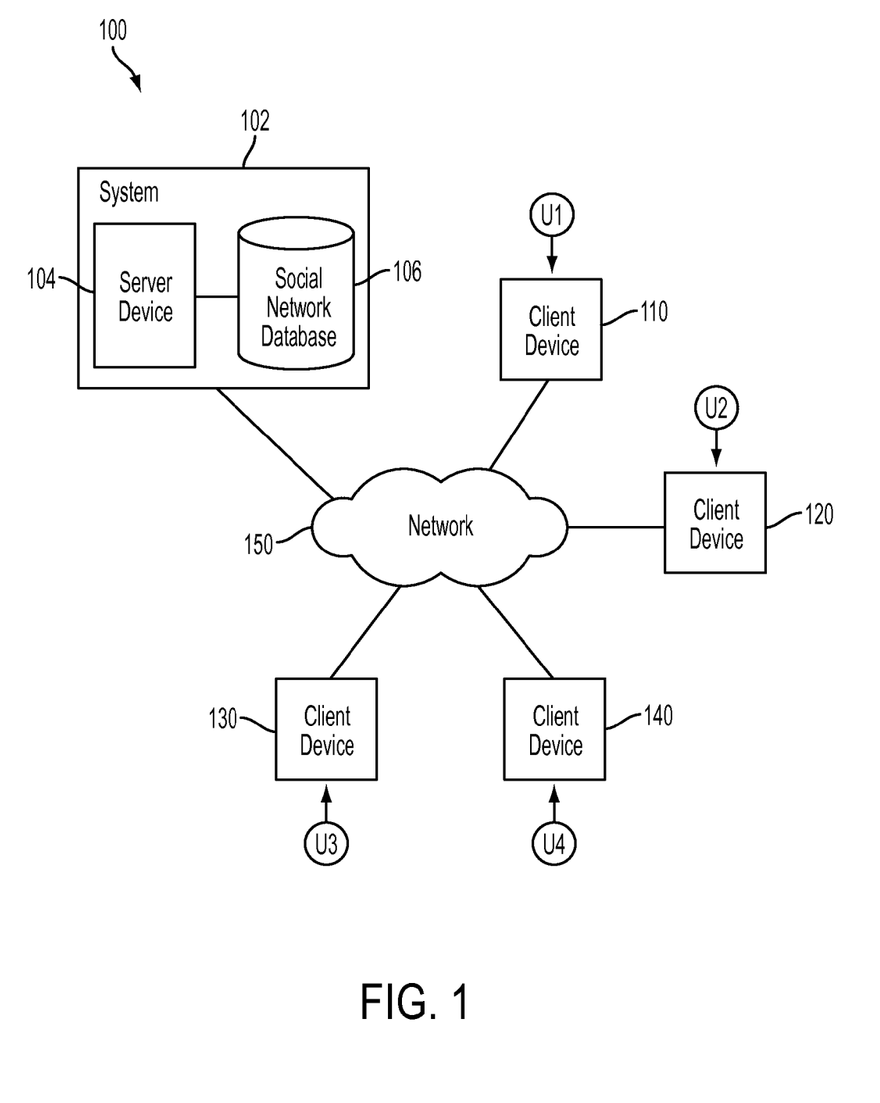
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150. Each client device 110, 120, 130, and 140 may be any type of electronic device such as a mobile phone, a tablet, a computer, mobile internet device, wearable computer, etc.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may post messages to other users or social network groups of the social network system 102.

Figure 2:
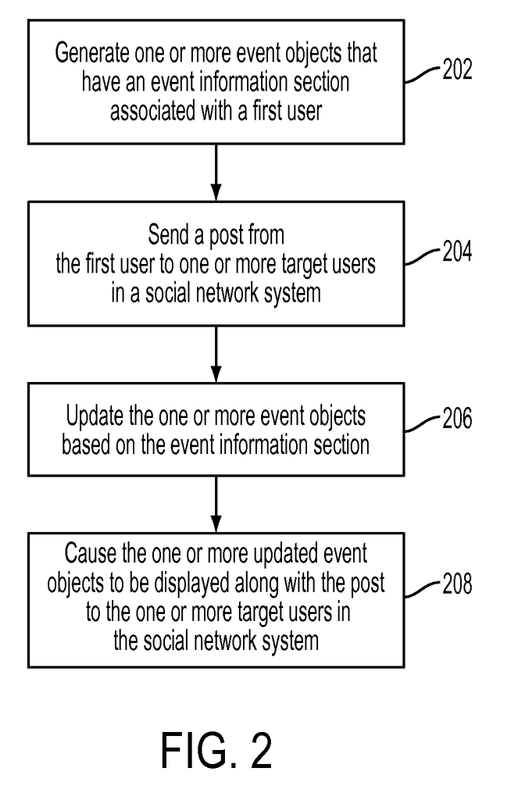
FIG. 2 illustrates an example simplified flow diagram for updating posts in a social network system.

FIG. 2 illustrates an example simplified flow diagram for updating events in a social network system 102. Referring to both FIGS. 1 and 2, a method is initiated in block 202, where system 102 generates one or more event objects that have an event information section associated with a first user.

In block 204, system 102 sends a post from the first user to one or more target users in a social network system 102. A post may be text, images, videos, audio files, hyperlinks to websites, etc.

In block 206, system 102 updates the one or more event objects based on the event information section. As described in more detail below, system 102 may determine updates based on, for example but not limited to temporal data, location data, check-in data, activity data, and/or event data.

In block 208, system 102 causes the one or more updated event objects to be displayed along with the post to one or more target users in the social network system 102.

Figure 3:
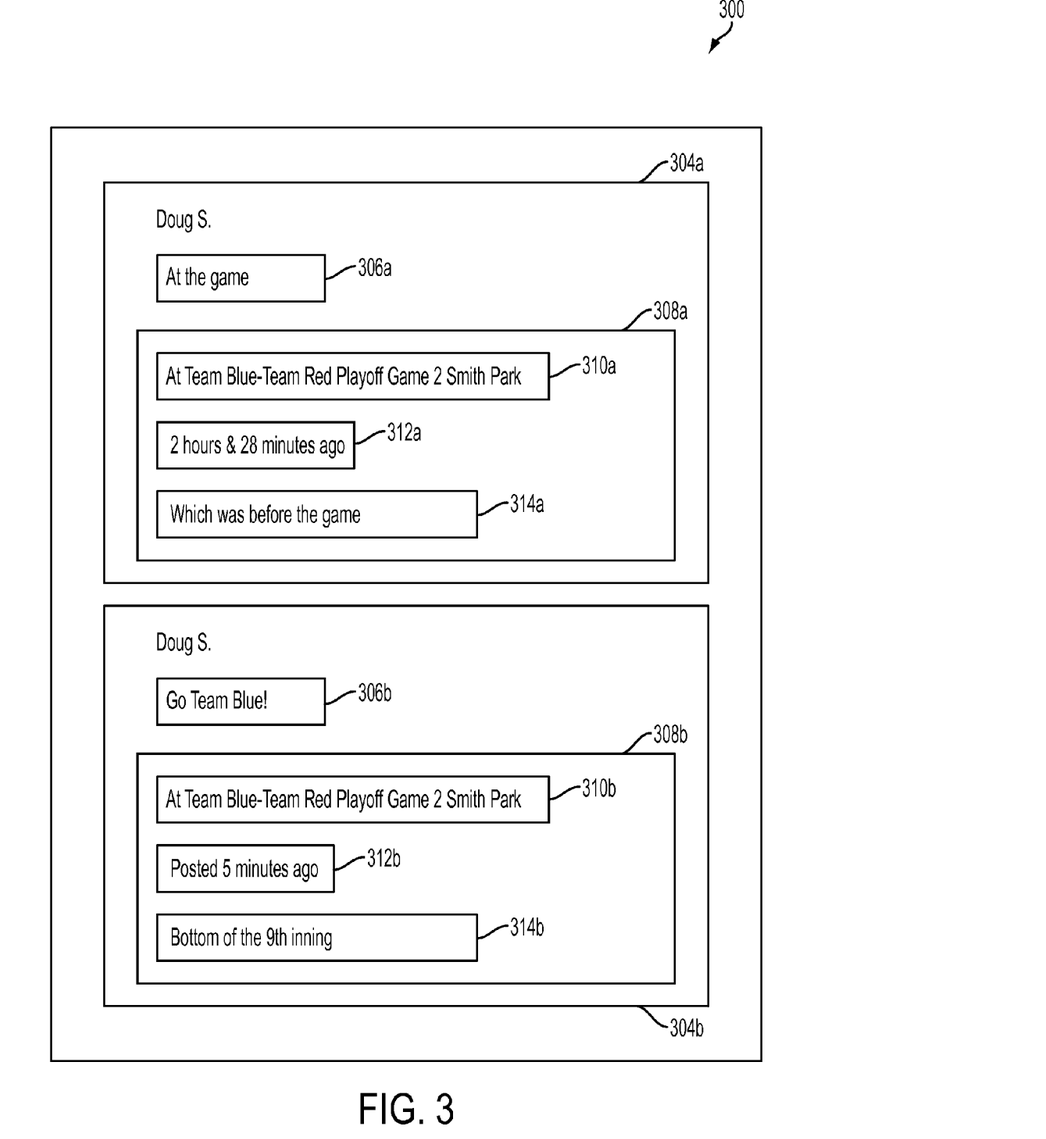
FIG. 3 illustrates an example simplified user interface enabling a user to update a post, according to some implementations.

FIG. 3 illustrates an example simplified user interface 300, enabling the user to create a post 304a, according to some implementations. As shown, system 102 enables the user, also referred to herein as the sender, to display content such as text 306a (e.g., "At the game") in user interface 300. In some implementations, system 102 may generate, without further user input, an event object 308a that includes event data 310a (e.g., "At Team Blue-Team Red Playoff Game 2 Smith Park"). In some implementations, the event data 310a may be based on location data and temporal data. In other implementations, the event data 310a may be determined from check-in information associated with a device of the user. For example, if a user checks in to an event, system 102 may use check-in data to provide event data 310a.

In various implementations, system 102 displays a posting time 312a (e.g., "Posted 2 hours & 28 minutes ago") of the first post 304a. In some implementations, posting time 312a may be obtained from activity data associated with the user. In other implementations posting time 312a may be determined from the device of the user or from check-in data.

In some implementations, system 102 displays event information 314a (e.g., "which was before the game") associated with the user. System 102 may provide event information 314a without user input, based on event data 310a. In an implementation, event information 314a may be based on mapping predetermined event temporal data to current temporal data. In some implementations, predetermined event temporal data include milestones or important points in time that relate to the set-up of the event (e.g. the beginning, middle, or end). For example, if a particular event has a first half and second half, system 102 may receive temporal data indicating that it is still the first half. In various implementations, non-limiting examples of predetermined event temporal data include innings, quarters, halves, scenes, acts, periods, games, sets, matches, stages, terms, stanzas, rounds, etc.

In some implementations, system 102, without user input, updates event object 308a, based on event information 314a. In an implementation, the user creates another post 304b, with new text 306b (e.g., "Go Team Blue!"). In another post 304b, system 102, without further user input, generates event object 308b, posting time 312b and event information 314b. In an implementation, system 102, without further user input, updates event object 308b and causes updated event information 314b to be displayed (e.g., "Bottom of the $9^{th}$ inning").

Figure 4:
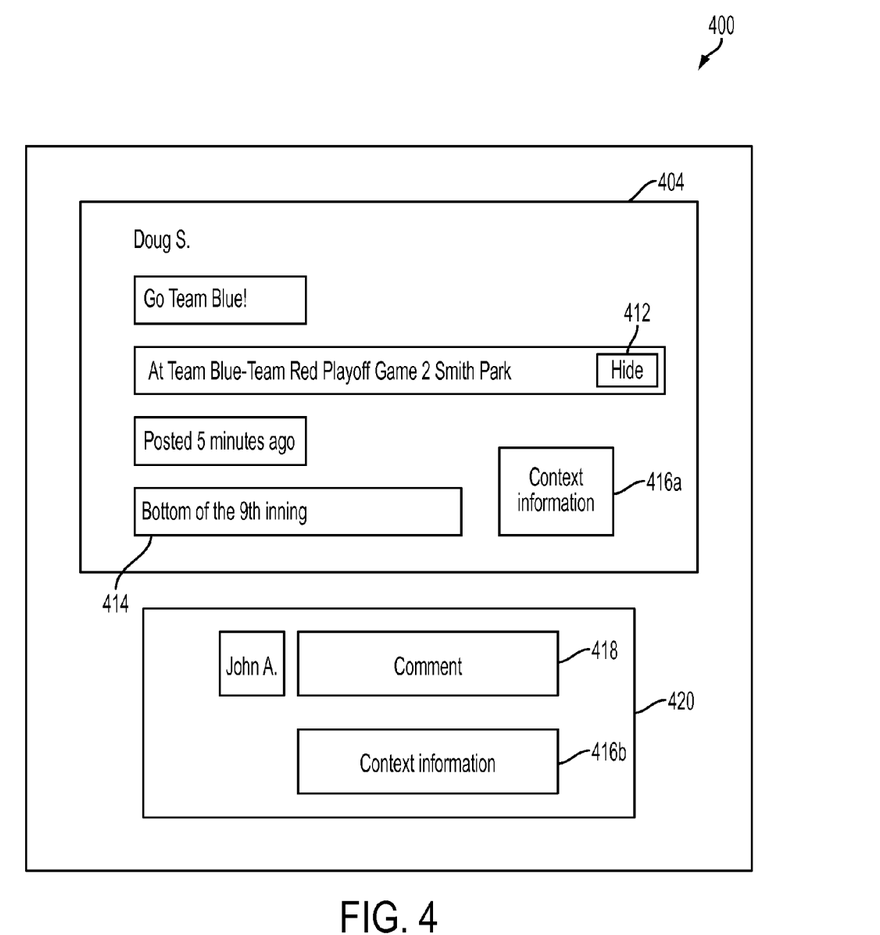
FIG. 4 illustrates an example simplified user interface enabling the user to update a post, according to some implementations.

FIG. 4 illustrates an example simplified user interface 400, enabling the user to create a post 404, according to some implementations. System 102 may provide context information 416a in the post 404. Context information 416a may be provided at the time of a given posting or when a target user views the post 404. Context information 416a is information relevant to one or more actions in the event, and context information 416a is provided without the need for user input. For example, system 102 may start with providing context information 416a based on actions in the event that users would find notable. In some implementations, context information 416a may include actions occurring in an event that are interesting in relation to the event information 414 based on time sensitivity or types of actions as they relate to the overall set-up of the event.

For example, as illustrated in FIG. 4, the event information 414 indicates that it is the "Bottom of the $9^{th}$ inning" System 102 determines that one or more actions occurring in a baseball game the bottom of the $9^{th}$ inning may be considered notable by users of the social network system 102. Accordingly, at this juncture, system 102 may provide context information 416a including actions such as runners on base, number of outs, balls and strikes, etc. Context information 416a may be text or symbols of various designs, sizes, shapes, patterns, or colors. For example, context information 416a could include a map of the bases with icons labeled with players' names representing base runners on base.

In some implementations, system 102 may receive a comment 418 from a target user in a dependent post 420, associated with post 404. At the time of the target user's dependent post 420, or when another user views or comments on the target user's dependent post 420, system 102 may then provide context information 416b in the target user's dependent post 420. Context information 416b provided by system 102 may be relevant to comment 418, without the need for user input. In an example implementation, if dependent post 420 relates to a particular action, context information 416b may include a general reference to that action. For example, if the target user's comment 418 was, "Finally some offense by the Team Red!" system 102 may provide context information 416b such as, "after Team Red scored a run 2 minutes ago."

In some implementations, event information and context information may be used to rank given posts in a social network stream relating to an event. In some implementations, system 102 may rank given posts in a social network stream based on a social affinity score based on predetermined criterion. In some implementations, the predetermined criteria may include event information such as milestones or important points in time that relate to the set-up of the event (e.g., the beginning, middle, or end). In some implementations, a predetermined criterion may include a given post generating a sufficient amount of social activity. Social activities may include, but not be limited to: viewing, commenting or providing feedback on, liking, sharing, forwarding, linking to posts, the amount of time other users view the post, whether a shared link was clicked, and/or whether the post was hidden, etc.

System 102 may cause given posts with a higher social affinity score to appear in a predetermined prominent location in the user interface (e.g., at the top of the user interface) relative to other posts. In some implementations, displaying posts more prominently may include using another delivery method such as generating push notifications that vibrate the mobile devices of the recipients and display the posts on their screens.

In various implementations predetermined criteria includes context information in given posts. In some implementations, social affinity score may be based in part on system 102 mapping context information from various posts to determine how context information is related.

In another example implementation, system 102 may determine that it is a critical juncture of a given event (e.g., in a sporting event this could be the end of the sporting event), and that a given post includes context information indicating a scoring play. In this example implementation, the scoring play may contribute to the predetermined criteria that are used to calculate the social affinity score of the post. Accordingly, the post will be ranked more prominently in a user's social network stream. System 102 may determine how event information and context information compare among posts and use the comparative values to in part calculate social affinity scores for respective posts. System 102 may then rank the posts accordingly.

In another example implementation, in a baseball event, system 102 may provide context information including a batter taking a ball. This scenario may lead to a higher social affinity score than a batter taking a strike. In yet another example implementation, system 102 may provide a higher social affinity score for a post that includes context information indicating a batter taking a strike (as opposed to a ball) as more interesting; for example this may be a scenario of a runner stealing a base, and is more likely to be thrown out because the batter decided to take a strike. In another example scenario, system 102 may provide a higher social affinity score for a post that includes the context information that the team at bat has the tying or lead run at bat, and therefore could tie the game or take the lead by scoring. In another example scenario, system 102 may provide a higher social affinity score for a posting in the end of an event as opposed to at the start.

In some implementations, a predetermined criteria may include the topic of (or content in) the post being one that one or more target users tend to comment on (e.g., family, travel, pets, etc.). In some implementations, a predetermined criteria may include determining one or more target users who meet a predetermined social affiliation criteria (e.g., being "close friends," "family," etc.), or are part of predetermined social network groups or groups of social network groups. In some implementations, social activity may include activity by people on the social network that informs whether a given post by someone might be interesting, such as feedback, comments, views, and/or sharing.

In various implementations, signals of a post being interesting or uninteresting (other than comments and recommendations, etc.) may include a target user's association with aspects of the event object. In some implementations, system 102 may apply a scoring algorithm to calculate a social affinity score based on information associated with target users who tend to post comments. For example, if the event data indicates that the Team Blue are playing, and the target user is a huge Team Blue fan (e.g. has joined a social network community for the Team Blue, and the target user tends to comment and post on the Team Blue), then system 102 may increase the social affinity score for the target user associated with a user's posts that include event data relating to the Team Blue. Accordingly, posts mentioning the Team Blue may have a higher ranking in the target user's social network stream.

Although sports events are used as some of the illustrated examples herein, system 102 is not limited to the context of sports events. Other non-limiting examples of events include restaurant events, meeting events, concert events, park events, weather events, company events, party events, ceremony events, election events, sales events and the like. In some implementations, context information for various events may include actions that are interesting in relation to the to the overall setup or structure of the event.

In an example embodiment, a user may check-in to a voting location on election day, and system 102 generates a post with the user's consent. An event object included in the post may include event information such as the vote count at the time the post is generated or viewed. In some implementations, at the time the user sends a post or target users comment or view the post, context information may provide the various election candidates and their current percentage and/or projected share of votes received.

In another example implementation, the user may check-in to a political debate. The user may post a video of a portion of the debate and a corresponding comment. When target users view the post, system 102 may provide context information such as the amount of sharing, commenting, and feedback on the video of the portion of the debate. Also, system 102 may provide event information in the form of an animated timer indicating how many minutes have elapsed in the debate from the time of the target user's initial viewing or commenting on the post, for example "during the first round of the debate."

In an example implementation, the user checks into a store during a sales event. System 102 may provide context information such as the number of people in the store during the sales event and/or special deals on particular items. System 102 may also provide event information such as "one hour left in the sale." In another example implementation, the user checks into a restaurant. System 102 may provide context information such as details on, or a sample audio track of, the song being played by a live band at the restaurant.

Figure 5:
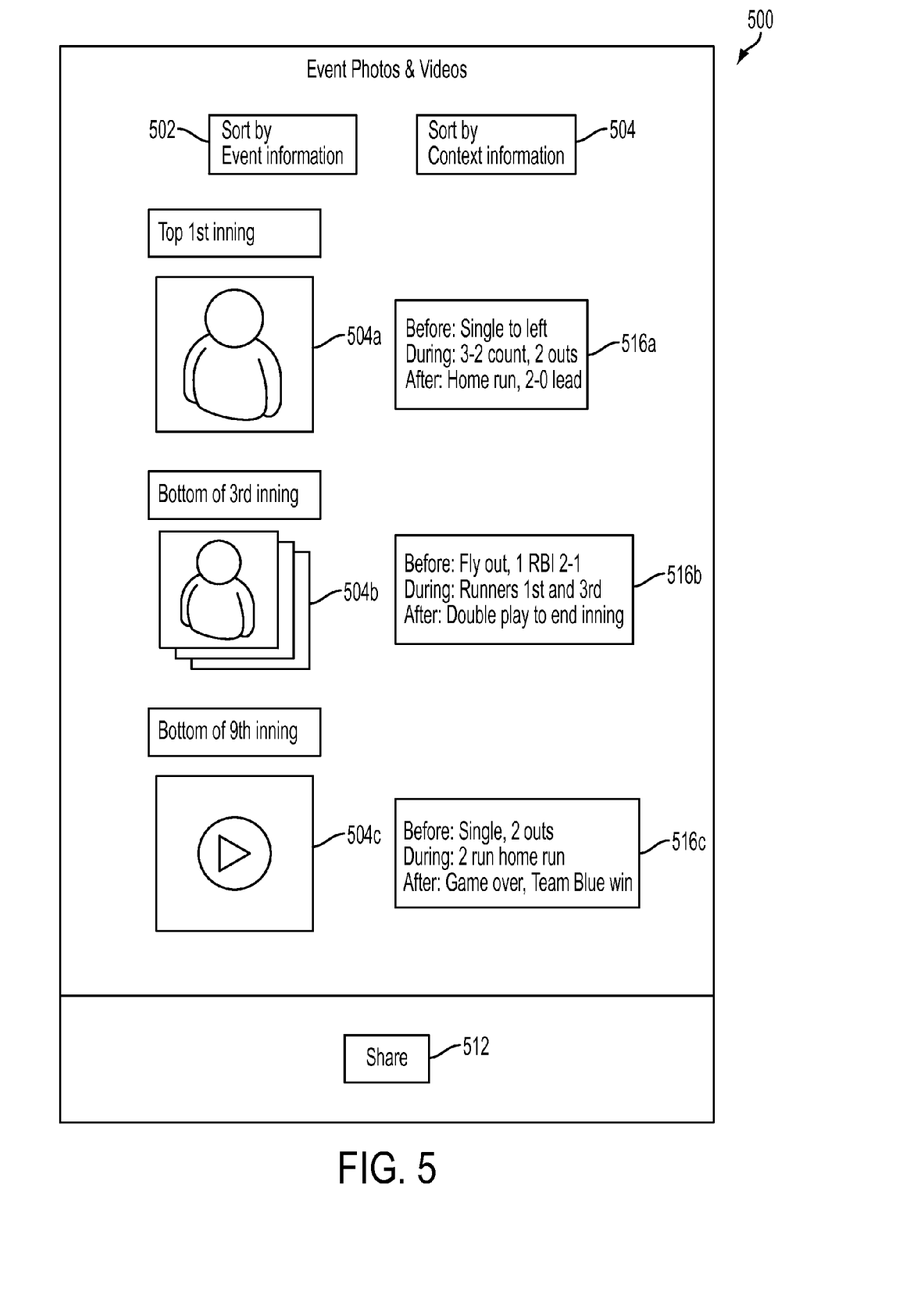
FIG. 5 illustrates an example simplified user interface enabling the user to update a post, according to some implementations.

FIG. 5 illustrates an example simplified user interface 500, enabling the user to organize posts based on event information and/or context information, according to some implementations. In some implementations, system 102 displays a sort by event information button 502 and a sort by context information button 504. As shown, in an example implementation, system 102 enables the user to display posts 504a-504c that may include, but are not limited to text, audio, links, a single image 504a, multiple images 504b, or video 504c. System 102 may display event information and context information associated with posts 504a-504c.

In an example implementation, system 102 displays context information in the form of what happened before, during, and after a posting. For example referring to post 504a of an image, before post 504a there was a "Single to left," as shown in context information 516a, during post 504a there was a "3-2 count, 2 outs," as shown in context information 516a, and after post 504a there was a "Home run, 2-0 lead," as shown in context information 516a. In another example implementation, event information for post 504a may indicate that it is the "Top $1^{st}$ inning."

In some implementations, if the user selects the sort by event information button 502, system 102 organizes posts 504a-504c by event information. For example posts 504a-504c may be ordered by the time the images or videos were taken during the event (e.g. $1^{st}$ inning images at the top of the user interface and a $9^{th}$ inning video at the bottom of the user interface).

If the user selects the sort by context information button 502, system 102 may organize posts 504a-504c by context information 516a-516c. For example posts 504a-504c may be ordered based on the relative importance of the context information 516a-516c provided and associated with the respective posts 504a-504c. In an example implementation, post 504c with video that is associated with the context information 516c indicating it was taken during the "2 run home run," may be the most prominently displayed at the top of the user interface.

In some implementations, the user may take many images and videos while attending an event. The user may then organize the videos and images by selecting the sort by event information button 502 or the sort by context information button 504. The user may then share the videos and images as organized by the selected button with other users in a social network system 102 by selecting the share button 512.

In some implementations, system 102 may provide a mechanism for users to prevent posts from entering their social media stream that contain context information that users do not wish to see until a later time. For example, a user may be recording a live event for later playback and does not wish for the later playback experience to be spoiled by knowing the outcome of the event (e.g., the final score). Referring to FIG. 4, in this particular example, system 102 provides a button 412 (e.g., labeled "Hide") to enable the user to hide context information related to specific events that user does not wish to see until perhaps a later time. In an example implementation, a user sees the message in post 404, the user realizes they don't wish posts related to this event to enter their social media stream. Accordingly, the user can simply select the button 412 (labeled "Hide") to prevent or hide posts and context information related to the event from entering the user's social media stream.

In some implementations, event information and/or context information is highlighted in a given post. For example, event information or context information may be presented in a different font color or style, or with a shaded or highlighted background, to distinguish event information or context information from other content in the given post.

In some implementations, context information may lead in part to target users requesting more information such as a text, photo, or video about a post. For example, a given post may include context information that the team a target user wants to win is about to score (e.g., "Team Yellow on the Team Green 2 yard line"). In an example implementation, system 102 could provide a user interface that allows the target user to select a button (e.g. by hovering over, tapping, or clicking) to request a photo from the user. In some implementations, a user may be prompted later after the game to provide the requested photo to the given target user. When the user provides the photo later, system 102 may provide corresponding context information such as event information and context information (e.g. "$4^{th}$ quarter-2 minutes left-Team Yellow on the Team Green 2 yard line"), or the nearest and/or highest ranked photo/video to what was requested by the user.

Implementations described herein provide various advantages. For example, implementations encourage users to post messages because system facilitates the user in updating posts with important and interesting actions from an event. As such, implementations described herein also increase overall engagement among users in a social networking environment.

Figure 6:
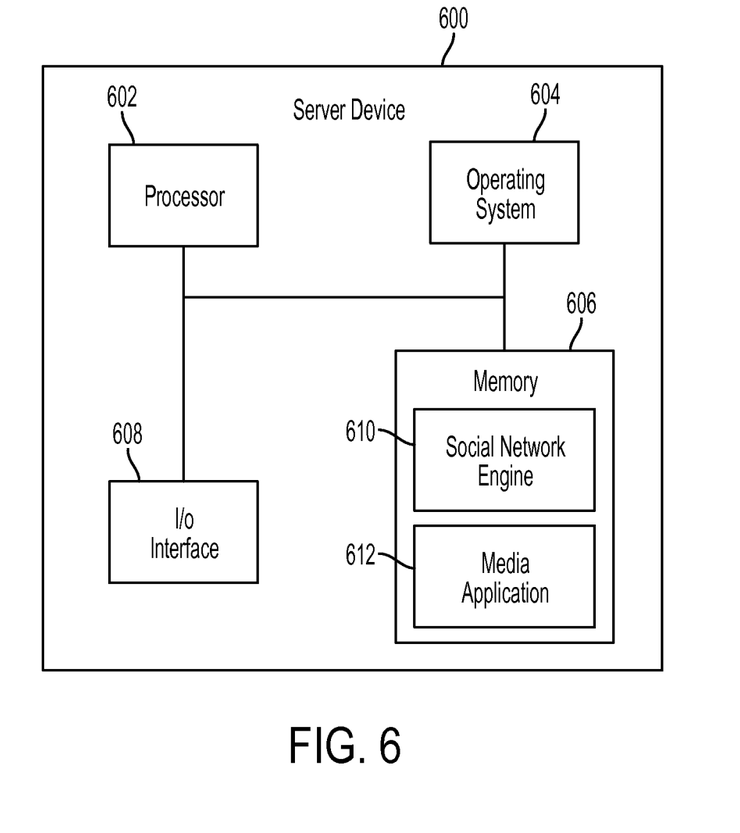
FIG. 6 illustrates a block diagram of an example server device, which may be used to implement the implementations described herein.

FIG. 6 illustrates a block diagram of an example server device 600, which may be used to implement the implementations described herein. For example, server device 600 may be used to implement server device 104 of FIG. 1, as well as to perform the method implementations described herein. In some implementations, server device 600 includes a processor 602, an operating system 604, a memory 606, and an input/output (I/O) interface 608. Server device 600 also includes a social network engine 610 and a media application 612, which may be stored in memory 606 or on any other suitable storage location or computer-readable medium. Media application 612 provides instructions that enable processor 602 to perform the functions described herein and other functions.

For ease of illustration, FIG. 6 shows one block for each of processor 602, operating system 604, memory 606, I/O interface 608, social network engine 610, and media application 612. These blocks 602, 604, 606, 608, 610, and 612 may represent multiple processors, operating systems, memories, I/O interfaces, social network engines, and media applications. In other implementations, server device 600 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

In various implementations, assistant services may be accessed on a device to assist the needs of a user. In some implementations, assistant services may be provided from one or more systems accessed remotely over one or more networks, such as the Internet or World Wide Web. For example, the services may be provided by one or more server systems connected to a network. Some implementations may implement assistant services locally to a device. Expert systems may be used in some implementations to provide desired information in specific subjects.

In some implementations, assistant services may include the use of intelligent assistants or "agents." These agents may be software that is accessible to a user using a device and that may access local functions and features of the device, as well as remote assistant services to gather information and/or perform actions to assist a user of the device. The agent may perform any of a variety of assistive functions.

Some implementations may provide an agent having a simple and natural interface to allow users to easily interact with the agent. In some examples, agents may perform user-friendly natural language processing of user input, for example the user may use spoken input to create posts to send to other users in a social network system 102. For example, an agent may use voice recognition systems to interpret spoken input from the user and display the post to target users.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location may not be determined. Thus, the user may have control over how information is collected about the user and used by a content server.

What is claimed is:

1. A method comprising:
   receiving location data related to a location of a device associated with a first user;
   receiving user temporal data corresponding to a time when the device associated with the first user is at the location;
   generating one or more event objects having an event information section associated with the first user, wherein the event information section is based on the location data, and the user temporal data;
   sending the posts from the first user to one or more target users in a social network system;
   receiving event temporal data that describe one or more periods in time that relate to a set-up of an event;
   updating the one or more event objects based on an automatic mapping of the event temporal data to current temporal data;
ranking posts from the first user based on the event temporal data; and
   causing the one or more event objects to be displayed along with the posts in a ranked order to the one or more target users in the social network system.

2. A method comprising:
   generating one or more event objects having an event information section associated with a first user;
   sending one or more posts from the first user to one or more target users in a social network system;
   receiving event temporal data that describe one or more periods in time that relate to an event;
   updating the one or more event objects based on the event information section, wherein updating the one or more event objects is based on an automatic mapping of the event temporal data to current temporal data; and
   causing the one or more updated event objects to be displayed along with the one or more posts to the one or more target users in the social network system.

3. The method of claim 2, wherein the event information section includes context information that comprises one or more time sensitive actions that occur at the event.

4. The method of claim 2, further comprising receiving user temporal data corresponding to activity data associated with one or more actions of the first user.

5. The method of claim 2, further comprising receiving location data from a global positioning system (GPS) sensor included in a device of the first user.

6. The method of claim 2, wherein the event information section is determined from check-in information associated with a device of the first user.

7. The method of claim 2, wherein the event information section includes context information relevant to the event.

8. The method of claim 2, wherein the updating of the one or more event objects based on the event information section is based on a length of time since the one or more event objects were displayed.

9. The method of claim 2, wherein the event information section includes context information, and a ranking of the one or more posts is determined in part based on the context information.

10. The method of claim 2, wherein the updating of the one or more event objects based on the event information section is based on a time the one or more target users in the social network system view the one or more posts.

11. The method of claim 2, wherein the updated one or more event objects are displayed along with comments to the one or more posts provided by the one or more target users in the social network system.

12. A system comprising:
one or more processors; and
logic encoded in or more tangible media for execution by the one or more processors and when executed operable to perform operations comprising:
generating one or more event objects having an event information section associated with a first user;
sending one or more posts from the first user to one or more target users in a social network system;
receiving event temporal data that describe one or more periods in time that relate to an event;
updating the one or more event objects based on the event information section, wherein updating the one or more event objects is based on an automatic mapping of the event temporal data to current temporal data; and
causing the one or more updated event objects to be displayed along with the one or more posts to the one or more target users in the social network system.

13. The system of claim 12, wherein the logic when executed is further operable to perform operations comprising receiving location data related to a location of a device associated with a first user, and wherein the location data is provided by activity data associated with one or more actions of the user.

14. The system of claim 12, wherein the logic when executed is further operable to perform operations comprising receiving user temporal data corresponding to activity data associated with one or more actions of the first user.

15. The system of claim 12, wherein the logic when executed is further operable to perform operations comprising receiving location data from a global positioning system (GPS) sensor included in a device of the first user.

16. The system of claim 12, wherein the logic when executed is further operable to perform operations comprising receiving location data and temporal data of the first user, and wherein the location data and temporal data are determined from check-in information associated with a device of the first user.

17. The system of claim 12, wherein the event information section includes context information relevant to the event.

18. The system of claim 12, wherein the updating of the one or more event objects based on the event information section is based on a length of time since the one or more event objects were displayed.

19. The system of claim 12, wherein the updating of the one or more event objects based on the event information section is provided from specific and relevant information about the event, and is based on a time at which the one or more event objects were displayed.

20. The system of claim 12, wherein the updating of the one or more event objects based on the event information section is based on a time the one or more target users in the social network system view the one or more posts.

* * * * *